HENDERSON ROSS & JOHN H. CLEMENS.
Furnaces for Manufacture of Iron and Steel.
No. 4,609. Reissued Oct. 24, 1871.
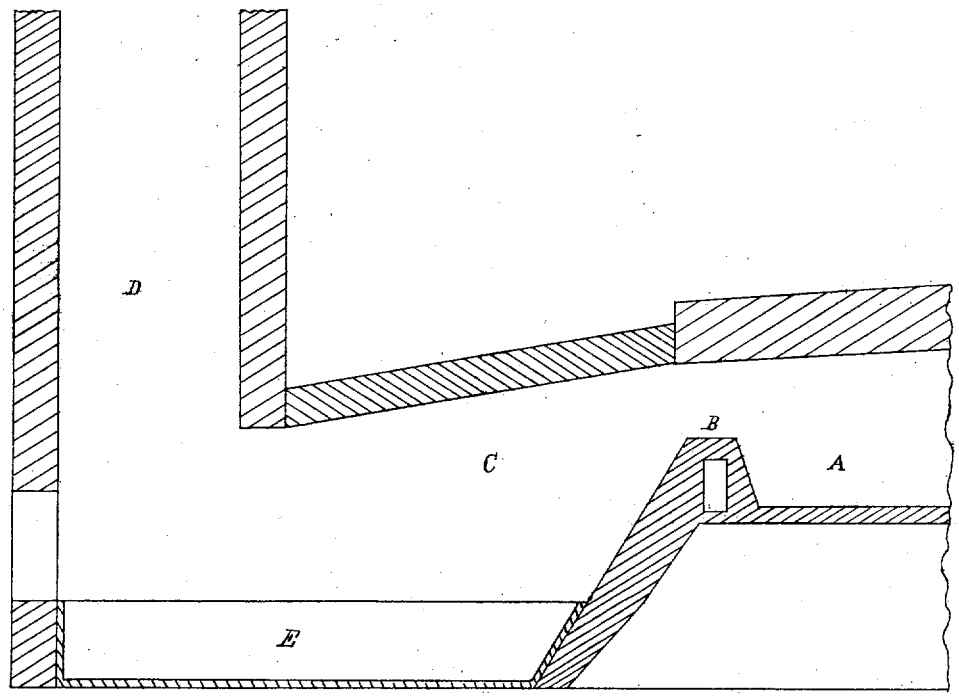
Witnesses
Wm. W. L. Dyre.
Jno. D. Patten.
Inventor.
Henderson Ross & John H. Clemens
By L. L. Johnston & Bro.
their Attys
N. PETERS, PHOTO-LITHOGRAPHER, WASHINGTON, D. C.

UNITED STATES PATENT OFFICE.

HENDERSON ROSS AND JOHN H. CLEMENS, OF PITTSBURG, PENNSYLVANIA.

IMPROVEMENT IN FURNACES FOR THE MANUFACTURE OF IRON AND STEEL.

Specification forming part of Letters Patent No. 118,279, dated August 22, 1871; reissue No. 4,609, dated October 24, 1871.

*To all whom it may concern:*

Be it known that we, HENDERSON ROSS and JOHN H. CLEMENS, of Pittsburg, in the county of Allegheny and State of Pennsylvania, have invented certain new and useful Improvements in Furnaces for the Manufacture of Iron and Steel; and we do hereby declare that the following is a full, clear, and exact description thereof, reference being had to the accompanying drawing, and to the letters of reference marked thereon.

The nature of our invention consists in bringing the flame of a furnace, after it leaves its working-chamber, in direct contact with water, so that its destructive action upon the neck and stack of the furnace shall be diminished or destroyed.

To enable others to make and use our invention, we will proceed to describe its construction and operation, and one method of applying the same to a furnace used in the manufacture of iron or steel.

The accompanying drawing, which forms part of our specification, represents a vertical and longitudinal section of a "puddling" or "boiling" furnace.

A represents a section of the working-chamber. B represents the flue-bridge wall. C represents the neck of the furnace, and D represents its stack. In the bottom of the neck C, and at the bottom of the stack D, is placed a water-box, E, which may be constructed of sheet-iron, cast-iron, or of any other suitable material. This box is supplied with water through the medium of pipes or other device connected with a water-supply. The flame, after it leaves the working-chamber A, its under side striking on the surface of the water in box E, causes a vapor to ascend and mix with the flame, which will so deaden or diminish its intensity that its destruction or cutting action on the inner surface of the walls of the neck and stack of the furnace will be obviated.

From the foregoing it will be readily understood that the intensity of the flame in the neck and stack of the furnace is mellowed down by its contact with water, or by the action of water upon the flame. We wish it, therefore, clearly understood that we do not confine our invention to the single method hereinbefore described for bringing the flame in the neck and stack of the furnace in direct contact with water, or water with the flame, for it is very apparent that other means may be employed for subjecting the flame to the action of the water, and a similar effect and like result obtained.

In applying our invention to a furnace we require no change of its size or form, but simply provide it with a water-box, as at E, or with other device, whereby the flame of the furnace is brought in direct contact with water, or water in contact with the flame, for the purpose of diminishing its intensity and mellowing it down, so that its cutting and wasting action shall be obviated, the advantage of which will be apparent to the manufacturer of iron and steel.

Having thus described our improvement in furnaces, what we claim as our invention is—

1. A furnace so constructed that the flame in its neck and in the lower end of its stack shall be brought in direct contact with water, and subjected to its decomposing and mellowing action, substantially as hereinbefore described.

2. A furnace for the manufacture of iron and steel, provided with a water-box, substantially as hereinbefore described, and for the purpose set forth.

HENDERSON ROSS.
JOHN H. CLEMENS.

Witnesses:
A. C. JOHNSTON,
JAMES J. JOHNSTON.